(12) United States Patent
Lofgren

(10) Patent No.: US 6,461,264 B1
(45) Date of Patent: Oct. 8, 2002

(54) POWER TRANSMISSION BELT HAVING RUBBER COATED FABRIC LAYER

(75) Inventor: Jeffery Dwight Lofgren, Lincoln, NE (US)

(73) Assignee: The Goodyear Tire & Rubber Company, Akron, OH (US)

(*) Notice: Subject to any disclaimer, the term of this patent is extended or adjusted under 35 U.S.C. 154(b) by 8 days.

(21) Appl. No.: 09/739,997

(22) Filed: Dec. 19, 2000

(51) Int. Cl.[7] .............................. F16G 9/00; F16G 5/00
(52) U.S. Cl. ........................................ 474/260; 474/263
(58) Field of Search .................. 474/260, 261, 474/263, 262, 264, 265, 271, 268, 205; 156/137, 138, 139, 140, 141; 264/254, 296; 425/343, 383; 442/59; 198/847, 846; 428/295.4; 525/221; 524/432

(56) References Cited

U.S. PATENT DOCUMENTS

| | | | | |
|---|---|---|---|---|
| 4,096,764 A | * | 6/1978 | Richmond et al. | |
| 4,127,039 A | * | 11/1978 | Hollaway, Jr. | |
| 4,504,258 A | * | 3/1985 | Tanaka et al. | 474/263 |
| 4,522,869 A | * | 6/1985 | Anderson, Jr. et al. | 474/260 |
| 4,682,973 A | * | 7/1987 | Fujita et al. | 474/263 |
| 4,778,437 A | * | 10/1988 | Wach et al. | 474/260 |
| 5,232,409 A | * | 8/1993 | Kanamori et al. | 474/260 |
| 5,860,883 A | * | 1/1999 | Jonen et al. | |
| 6,056,656 A | * | 5/2000 | Kitano et al. | 474/260 |

FOREIGN PATENT DOCUMENTS

JP    1203731    * 8/1989

* cited by examiner

Primary Examiner—Douglas C. Butler
(74) Attorney, Agent, or Firm—Bruce J. Hendricks; John D. DeLong

(57) ABSTRACT

An endless power transmission belt comprising a tension section; a cushion section; a load-carrying section disposed between the tension section and cushion section; and a fabric layer bonded to the outer surface of the belt, the improvement comprising a coating layer on the fabric layer of a carboxylated acrylonitrile rubber.

14 Claims, 1 Drawing Sheet

POWER TRANSMISSION BELT HAVING RUBBER COATED FABRIC LAYER

BACKGROUND OF THE INVENTION

Recently power transmission belts have been subject to increasingly damaging chemicals. As a result, power transmission belt life has been reduced. This environment demands a high quality belt capable of withstanding these severe chemicals. One method to improve the properties of such belts has been to improve the materials from which the belts are made of For example, conventional polychloroprene rubber has been replaced with hydrogenated nitrile rubber.

SUMMARY OF THE INVENTION

The present invention relates to a power transmission belt having a fabric layer bonded to the outer surface of the belt characterized by a fabric coating which is believed to reduce the coefficient of friction and improve oil resistance and minimize wear.

BRIEF DESCRIPTION OF THE FIGURES

The accompanying FIGURE shows embodiments of this invention in which:

DETAILED DESCRIPTION OF THE INVENTION

Figure 1:
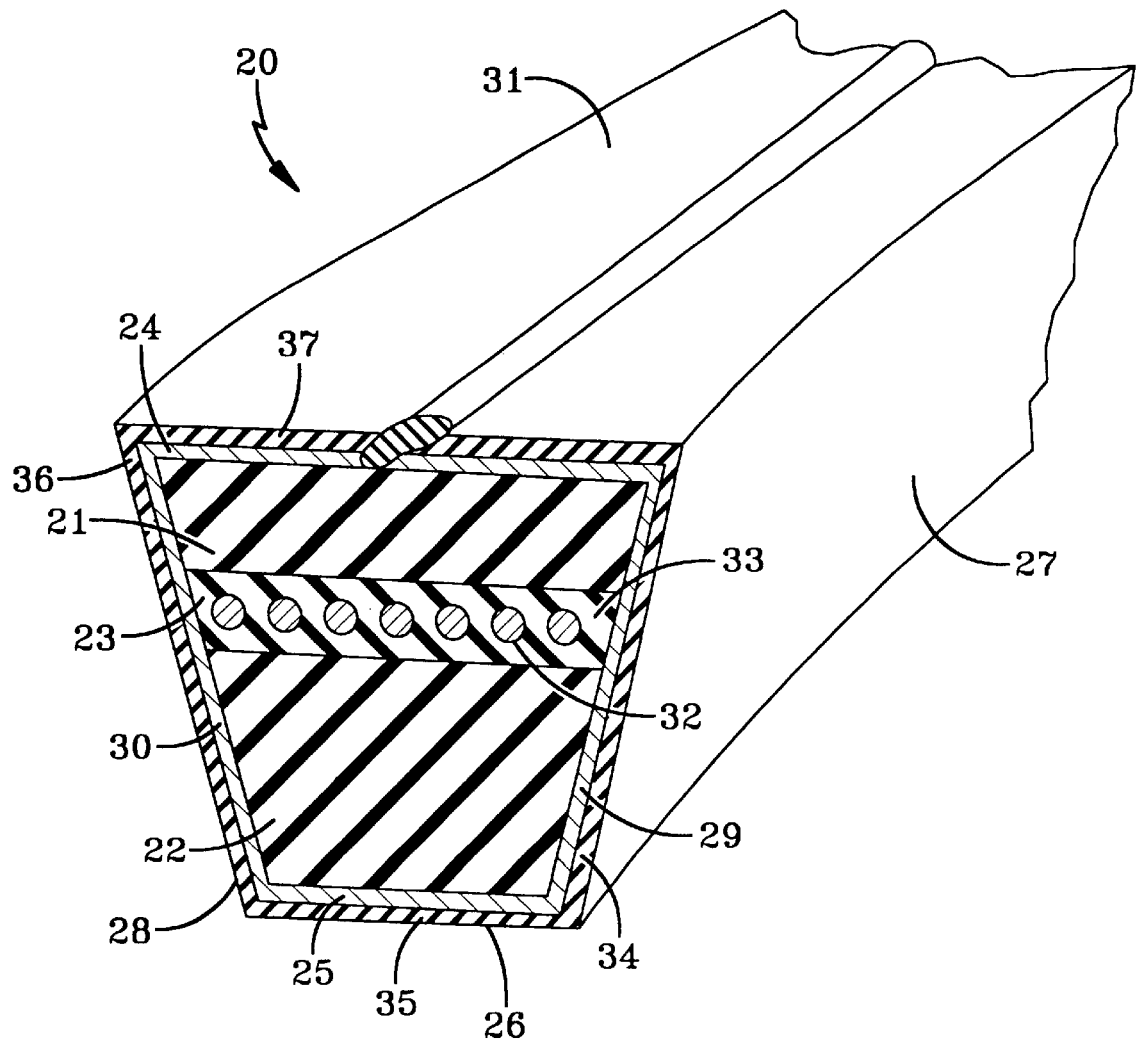
FIG. 1 is a fragmentary perspective view illustrating one embodiment of a fabric wrapped endless power transmission belt of this invention.

There is disclosed an endless power transmission belt comprising (A) a tension section;

(B) a cushion section;

(C) a load-carrying section disposed between said tension section and cushion section; and (D) a fabric layer bonded to the outer surface of the belt, the improvement comprising a coating layer on said fabric layer of a carboxylated acrylonitrile rubber containing compound.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in industrial applications. The belt 20 is particularly adapted to be used in so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 22 and a load-carrying section 23 disposed between the tension section 21 and cushion section 22. The belt 20 also has an outer fabric layer 25 (adhered to drive surface) which is wrapped around the belt including the non-drive surface 24.

In the belts of the present invention, there is at least one drive surface. In the embodiment shown in FIG. 1, there are three drive surfaces 26, 27 and 28, and since the belt is wrapped, there is a fabric layer 24, 25, 29, 30 on all sides.

Each fabric layer 24, 25, 29 and 30 may be made from a bi-directional, non-woven, woven or knitted fabric; and each fabric layer 24, 25, 29 and 30 is frictioned, spread or coated with an elastomeric material which is selected to assure the layer is bonded to its associated section in a tenacious manner.

The fabrics for use in the present invention are made of conventional materials including nylon (such as nylon 4,6, nylon 6,6 and nylon 6), cotton, polyester, cotton/polyester, nylon/polyester, cotton/nylon, Lycra™ (segmented polyurethane), aramid, rayon, and the like. Preferably, the fabric is made of cotton/polyester.

As described later, the coating composition 34, 35 and 36 is applied to the fabric layer 25, 29 and 30 of a drive surface 26, 27 and 28. In accordance with another embodiment, the coating composition 37 may be applied to the fabric layer 24 of a non-drive surface 31 in the same manner described herein for use on the fabric layer 25, 29 and 30 of a drive surface 26, 27 and 28.

The load-carrying section 23 has load-carrying means in the form of load-carrying cords 32 or filaments which are suitably embedded in an elastomeric cushion or matrix 33 in accordance with techniques which are well known in the art. The cords 32 or filaments may be made of any suitable material known and used in the art. Representative examples of such materials include aramids, fiberglass, nylon, polyester, cotton, steel, carbon fiber and polybenzoxazole.

The drive surface 26, 27 and 29 of the belt 20 of FIG. 1 is smooth. In accordance with other embodiments and as discussed later, it is contemplated herein the belts of the present invention also include those belts where the drive surface of the belt may be single V-grooved, multi-V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The rubber compositions for use in the tension section 21 and cushion section 22 may be the same or different. Conventional elastomers which may be used in one or both of these sections include natural rubber, polychloroprene, acrylonitrile-butadiene copolymers (NBR), polyisoprene, zinc salts of unsaturated carboxylic acid ester grafted hydrogenated nitrite butadiene elastomers, styrene-butadiene rubbers, polybutadiene, EPDM, hydrogenated acrylonitrile-butadiene copolymers (HNBR), polyurethane, elastomers marketed under the Viton™ designation and ethylene-acrylic elastomers sold under the name VAMAC and blends thereof The composition for use as a coating layer on the fabric of the drive surface contains a carboxylated acrylonitrile rubber. Such carboxylated nitrite rubbers contain chain linkages derived from unsaturated carboxylic acids of the acrylic acid type (unsaturated carboxylic acid monomers). Some representative examples of unsaturated carboxylic acids of the acrylic acid type include acrylic acid, methacrylic acid, sorbic acid, β-acryloxypropanoic acid, ethacrylic acid, 2-ethyl-3-propyl acrylic acid, vinyl acrylic acid, cinnamic acid, maleic acid, fumaric acid and the like. Carboxylated nitrile rubbers generally contain from about 0.75 percent to 15 percent by weight chain linkages (repeat units) which are derived from unsaturated carboxylic acid monomers.

The carboxylic nitrile rubbers can be synthesized using any conventional polymerization technique. Emulsion polymerization of carboxylated nitrile elastomers is generally preferred and is used almost exclusively in industrial production. This type of a synthesis generally utilizes a charge composition comprising water, monomers, an initiator and an emulsifier (soap). Such polymerizations can be run over a very wide temperature range from about 0° C. to as high as 100° C. It is more preferred for these polymerizations to be run at a temperature from about 5° C. to 60° C.

The amount of carboxylic acid monomer (unsaturated carboxylic acid of the acrylic acid type) incorporated in a carboxylated nitrile rubber may be varied over a wide range. The monomer charge ratio between the carboxylic monomer and the comonomers employed in a polymerization may also be varied over a very wide range. Generally, the charge composition used in the synthesis of carboxylated nitrile rubbers will contain 60 percent to 75 percent by weight butadiene, 15 percent to 40 percent by weight of acrylonitrile and 1 percent to 15 percent by weight methacrylic acid, based upon the total monomer charge. A typical charge composition for a carboxylated nitrile rubber will contain 65 to 69 weight butadiene, 24 to 28 weight percent acrylonitrile and 5 to 9 weight percent methacrylic acid.

The emulsifiers used in the polymerization of such polymers may be charged at the outset of the polymerization or may be added incrementally or by proportioning as the reaction proceeds. Generally, anionic emulsifier systems provide good results; however, any of the general types of anionic, cationic or nonionic emulsifiers may be employed in the polymerization.

Among the anionic emulsifiers that can be employed in emulsion polymerizations are fatty acids and their alkali metal soaps such as caprylic acid, capric acid, pelargonic acid, lauric acid, undecylic acid, myristic acid, palmitic acid, margaric acid, stearic acid, arachidic acid and the like; amine soaps of fatty acids such as those formed from ammonia, mono- and dialkyl amines, substituted hydrazines, guanidine and various low molecular weight diamines; chain-substituted derivatives of fatty acids such as those having alkyl substituents; naphthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester or amide groups such as alkylbenzyl (polyethyleneoxy) alcohols, the sodium salt or tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

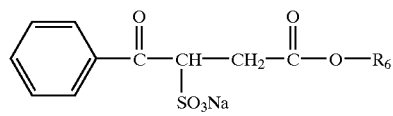

wherein $R_6$ is an alkyl group having from 1 to 20 carbon atoms; alkaryl sulfonates in which the alkyl groups contain preferably from 10 to 20 carbon atoms, e.g. dodecylbenzenesulfonates, such as sodium dodecylbenzenesulfonate; alkyl phenol sulfonates; sulfonic acids and their salts such as acids with the formula $R_6SO_3Na$, wherein $R_6$ is an alkyl and the like; sulfonamides, sulfamido methylene-sulfonic acids; rosin acids and their soaps; sulfonated derivatives of rosin and rosin oil; and lignin sulfonates and the like.

Rosin acid soap has been used with good success at a concentration of about 5 percent by weight in the initial charge composition used in the synthesis of carboxylated elastomers. Of rosin acids, about 90 percent are isomeric with abietic acid and the other 10 percent is a mixture of dehydro abietic acid and dihydro abietic acid.

The polymerization of these carboxylated nitrile rubbers may be initiated using free radical catalysts, ultraviolet light or radiation. To ensure a satisfactory polymerization rate, uniformity and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane and the like; the various alkyl perketals, such as 2,2-bis-(t-butylperoxy)butane, ethyl 3,3-bis(t-butylperoxy)butyrate, 1,1-di-(t-butylperoxy) cyclohexane and the like. Cumene hydroperoxide can be used as an initiator to obtain very good results in the polymerization of carboxylated nitrile rubber.

The emulsion polymerization system used in the synthesis of carboxylated nitrile rubbers can be treated at the desired degree of conversion with shortstopping agents, such as hydroquinone. Typical shortstopping agents will not interfere with the action of the succinic acid derivative salts as scorch inhibitors. Typical stabilizing agents and standard antioxidants can also be added to the emulsion of a carboxylated nitrile rubber.

After the emulsion polymerization has been completed, most conventional coagulating techniques for carboxylated nitrile rubbers can be employed. A review of coagulation techniques for nitrile rubbers is presented in Hofmann, Werner "Nitrile Rubber," *Rubber Chemistry and Technology*, Volume 37, No. 2, Part 2 (April–June 1964), Pages 94 through 96, which is incorporated herein by reference. Normally such latexes are coagulated with reagents which ensure the preservation of the carboxyl groups of the elastomers as acidic moieties. Coagulation with acid or blends of salts with acids is usually very satisfactory. For example, sulfuric acid, hydrochloric acid, blends of sodium chloride with sulfuric acid and blends of hydrochloric acids with methanol are very effective as coagulating agents for carboxylated rubber emulsions. Calcium chloride solutions which are free of calcium hydroxide have also been used as coagulants with great success.

After coagulation, washing may be employed to remove excess soap and/or electrolyte from the carboxylated rubber. Sometimes washing is also useful in adjusting the pH of the carboxylated elastomer that has been synthesized. After washing, if it is desired, the elastomer can be dewatered. If it is desirable to do so, the carboxylated rubber can also be dried and baled after dewatering using conventional techniques.

Examples of commercially available carboxylated nitrile rubber are HYCAR® 1072 (Bd/ACN=65/34, with 1 percent carboxylic acid) marketed by B. F. Goodrich and a product previously marketed as CHEMIGUM® NX-775 (Bd/ACN-55/26 with 7 percent carboxylic acid) by The Goodyear Tire & Rubber Company and now marketed by Nippon Zion. These carboxylated copolymers contain approximately 0.5 to 10 percent by weight terminal carboxyl groups.

The composition for the coating of the fabric may optionally contain from 5 to 60 phr of PTFE or Teflon®. The PTFE may be in the form of a powder, fiber, flock or mixtures thereof Such fibers or flock are commercially available having an average length of one sixty-fourth inch (0.4 mm) and a denier (per filament) of 6.7. PTFE powders are commercially available from numerous sources, including Daikin Kogyo Co. Ltd. under the designation Polyfron™ F103, DuPont under the designation DLX-600 and Alphaflex Industries, Inc. Typical PTFE powders or particles have diameters ranging from 100 to 600 microns.

The optionally PTFE powder or fiber may be present in various levels in the composition used for the coating layer. Generally speaking, the level of flock will range from 5 to 60 parts per weight per 100 parts by weight of rubber (phr) in the composition. Preferably, the PTFE is present in an amount ranging from 15 to 40 phr.

The elastomeric compositions for use in the coating layer may be crosslinked by sulfur or various peroxide containing curing agents. Peroxide curing agents which may be employed in the compositions of the invention include, for example, di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di (benzoylperoxy)-hexane, benzoyl peroxide, 2,5-dimethyl-2, 5-(t-butyl peroxy)-hexane, 1,1-ditert-butyl peroxy-3,3,5-trimethyl cyclohexane, 4,4-ditert-butyl peroxy n-butyl valerate and n-butyl-4,4-bis(t-butyl peroxy) valerate. Additional curing agents which may be employed include diacyl or dialkyl peroxides such as α,α'-bis(t-butylperoxy)-isopropylbenzene, 2,5-dimethyl-2,5-di(t-butylperoxy) hexane, di-t-butyl peroxide, 2,5-dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di (benzoylperoxy)-hexane and benzoyl peroxide. All of the above curing agents are commercially available.

The amount of peroxide curing agent that is used may vary. Generally speaking, the level will range of from 0.1 to 10 phr of sulfur or based on active parts of peroxide. Preferably, the level of peroxide or sulfur ranges from 1.0 to 3.0 phr.

The elastomeric composition for use in the coating layer may be cured with a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the remaining ingredients in the coating and the particular type of sulfur vulcanizing agent that is used. Generally speaking, the amount of sulfur vulcanizing agent ranges from about 0.1 to about 8 phr with a range of from about 1.0 to about 3 being preferred.

Accelerators may be used to control the time and/or temperature required for vulcanization of the coating. As known to those skilled in the art, a single accelerator may be used which is present in amounts ranging from about 0.2 to about 3.0 phr. In the alternative, combinations of two or more accelerators may be used which consist of a primary accelerator which is generally used in a larger amount (0.3 to about 3.0 phr), and a secondary accelerator which is generally used in smaller amounts (0.05 to about 1.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide. Preferably, the accelerator is a sulfenamide.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

Minor amounts of the carboxylated acrylonitrile butadiene rubber may be substituted with conventional rubbers. For example, from 0 to 30 parts by weight of the total 100 parts by weight of the composition may be substituted. Representative of the rubbers include medium vinyl polybutadiene, styrene-butadiene rubber, synthetic cis-1,4-polyisoprene, cis 1,4-polybutadiene, styrene-isoprene rubber, styrene-isoprene-butadiene rubber, acrylonitrile-butadiene rubber and mixtures thereof. Preferably, the rubber is natural rubber, styrene-butadiene rubber or cis 1,4-polybutadiene.

An optional but yet desirable ingredient in the coating composition is conductive carbon black. Among the various types of carbon blacks available, acetylene blacks and selected grades of furnace blacks produced from oil feed stocks are the types which are recognized by practitioners in rubber compounding as conductive carbon blacks. The degree of electrical conductivity of a carbon black-loaded rubber depends on a number of factors including the number of conductive paths provided by the black and the resistance of the carbon black particles. The chain structure and the level of combined oxygen present at the surface of the carbon black particles are factors that affect the conductivity of a particular type of carbon black. High chain structure, low oxygen carbon blacks are generally efficient conductors. A commonly used method of classifying the conductive character of a cured rubber composition is to measure the electrical resistivity (ohms-cm) of the rubber composition. For the purposes of this invention, a carbon black is considered conductive if it exhibits electrical resistivity of less than 106 ohms-centimeter when incorporated in the rubber at the desired level with all other compound ingredients. Currently available carbon blacks which exhibit such resistivity include conductive acetylene blacks available from Chevron Chemical Company and Denka, conductive furnace blacks available from Cabot Corporation, Ketjen Black available from Akzo. The most preferred carbon black is the Blackpearls 2000 from Cabot Corp. These carbon blacks exhibit an iodine number of 1050 g/kg +/−60 and a dibutylphthlate (DBP) absorption range of about 330+/−30 cc/100 g. The conductive carbon black may be added to the coating composition at levels of from about 10 to about 50 parts by weight per 100 parts by weight of rubber (phr).

In addition to the above, solid inorganic lubricants may optionally be present in the coating composition. Many times, such solid lubricants are dispersed with the PTFE. Representative examples of such lubricants include molybdenum disulfide, molybdenum diselenide, graphite, antimony trioxide, tungsten disulfide, talc, mica, tungsten diselenide and mixtures thereof. The amount of such solid inorganic lubricants, if used, will generally range from 1 to 25 phr.

The coating composition can be mixed conventionally in an internal mixer (e.g., a Banbury® mixer) with all of the ingredients being added initially, if so desired. They can also be mixed on an open mill in a conventional manner with the elastomer being first fluxed on the mill followed by the addition of the other non-curative ingredients and then followed by the cure package. The composition is then ready for further processing, such as calendering into a sheet form and application onto the fabric of the power transmission belt.

The coating composition may be applied to the fabric in a number of means. For example, calendering onto the fabric, calendering onto a transfer media and thereafter thermally transferring onto the fabric, solvating and spreading or spraying onto the fabric or transfer media.

The coating composition may be applied to the fabric of the belt in a variety of levels. The amount of coating composition may range from 0.05 kg/m2 to 1.0 kg/m2. The preferred level ranges from about 0.1 kg/m2) to 0.5 kg/m2.

While present exemplary embodiments of this invention and methods of practicing the same have been illustrated and described, it will be recognized that this invention may be otherwise variously embodied and practiced within the scope of the following claims.

What is claimed is:

1. An endless power transmission belt comprising
   (A) a tension section;
   (B) a cushion section;
   (C) a load-carrying section disposed between said tension section and compression section; and
   (D) a fabric layer bonded to the outer surface of the belt, the improvement comprising a coating layer on said fabric layer of an elastomeric composition accompanying a carboxylated acrylonitrile rubber.

2. The power transmission belt of claim 1 wherein from 70 to 100 parts by weight of the total 100 parts by weight of rubber in the coating layer is a carboxylated acrylonitrile rubber.

3. The power transmission belt of claim 1 wherein from 10 to 50 phr of a conductive carbon black is present in the composition.

4. The power transmission belt of claim 2 wherein from 30 to 0 parts by weight of the total 100 parts by weight of rubber in the coating layer is selected from the group consisting of medium vinyl polybutadiene, styrene-butadiene rubber, synthetic cis-1,4-polyisoprene, cis 1,4-polybutadiene, styrene-isoprene rubber, styrene-butadiene rubber, acrylonitrile-butadiene rubber and mixtures thereof.

5. The power transmission belt of claim 1 wherein said coating contained prior to cure, from 0.1 to 8 phr of a sulfur vulcanizing agent.

6. The power transmission belt of claim 5 wherein said sulfur vulcanizing agent is selected from the group consisting of elementary sulfur, amine disulfide, polymeric polysulfide, sulfur olefin adducts and mixtures thereof.

7. The power transmission belt of claim 6 wherein said sulfur vulcanizing agent is elemental sulfur.

8. The power transmission belt of claim 1 wherein the fabric layer is bonded to all outside surfaces of the belt.

9. The power transmission belt of claim 1 wherein said coating composition is present on said fabric in an amount ranging from 0.05 to 1 kg/m$^2$.

10. The power transmission belt of claim 9 wherein said coating composition is present on said outer fabric in a amount ranging from 0.1 to 0.5 kg/m$^2$.

11. The power transmission belt of claim 1 wherein a peroxide containing curing agent is present.

12. The power transmission belt of claim 11 wherein said peroxide containing curing agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di (benzoylperoxy)-hexane, benzoyl peroxide, 2,5-dimethyl-2, 5-(t-butyl peroxy)-hexane, 1,1-ditert-butyl peroxy-3,3,5-trimethyl cyclohexane, 4,4-ditert-butyl peroxy n-butyl valerate, n-butyl-4,4-bis(t-butyl peroxy) valerate, α,α'-bis(t-butylperoxy)-isopropylbenzene, 2,5-dimethyl-2,5-di(t-butylperoxy) hexane, di-t-butyl peroxide, 2,5-dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di (benzoylperoxy)-hexane, benzoyl peroxide and mixtures thereof.

13. The power transmission belt of claim 1 having three driving surfaces.

14. The power transmission belt of claim 1 wherein said carboxylated acrylonitrile rubber contains from 0.75 to 15 percent by weight chain linkage which are derived from an unsaturated carboxylic acid monomer.

* * * * *